United States Patent Office 3,367,744
Patented Feb. 6, 1968

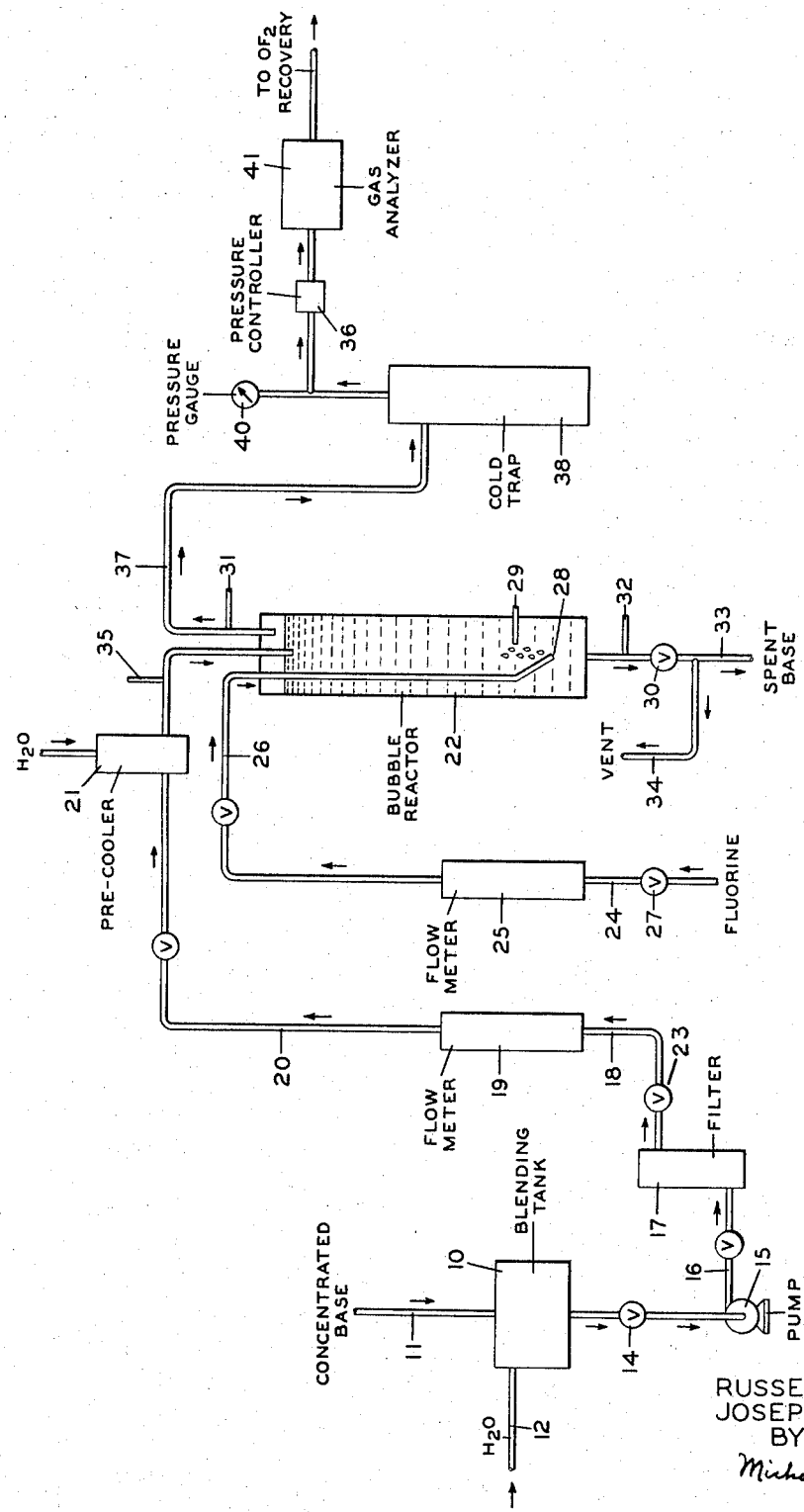

3,367,744
PRODUCTION OF OXYGEN DIFLUORIDE
Russell A. Brown, Mendham, N.J., and Joseph J. Ligi, Baton Rouge, La., assignors to Allied Chemical Corporation, New York, N.Y., a corporation of New York
Filed Aug. 17, 1965, Ser. No. 480,384
1 Claim. (Cl. 23—205)

ABSTRACT OF THE DISCLOSURE

This application is concerned with the preparation of oxygen difluoride by reaction of fluorine gas with an aqueous solution of a base at a temperature not greater than 70° F. and an aqueous liquid base to fluorine gas volume ratio in excess of 20 liters of aqueous base per liter of fluorine gas.

---

The present invention relates to the production of oxygen difluoride. More particularly, it is concerned with an improved continuous process free of operational difficulties whereby exceptionally high yields of oxygen difluoride unrealized by prior art procedures are obtained.

In recent times, oxygen difluoride has attracted much attention as an essential ingredient in several high energy propellent and explosive systems. Although various processes for preparation of oxygen difluoride have been reported in the literature, no practical commercial process for production of oxygen difluoride has been developed to date.

The most commonly method for the preparation of oxygen difluoride is based on the reaction:

$$2F_2 + 2MOH \rightarrow OF_2 2MF + H_2O \qquad (1)$$

wherein M is an alkali metal such as sodium or potassium.

One conventional procedure for preparing oxygen difluoride in accordance with this reaction involves a batch process wherein fluorine gas is flown concurrently with dilute caustic down a long narrow tube. In this procedure, excess quantities of fluorine, generally about 3 to 7 liters of fluorine per liter of caustic, are disclosed to be employed under practically all operating temperatures, generally ranging from about 70 to 105° F. The reaction is said to be carried out using short contact times to avoid the secondary reaction:

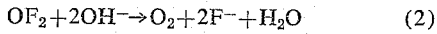

$$OF_2 + 2OH^- \rightarrow O_2 + 2F^- + H_2O \qquad (2)$$

Although oxygen difluoride yields up to about 70% have been reportedly obtained by this procedure, extremely rapid increase in temperature produced during the highly exothermic reaction together with large quantities of evolved gases, i.e., unreacted fluorine, oxygen difluoride product and oxygen produced by decomposition of oxygen difluoride product, cause unpredictable destructive explosive reactions not tolerable in commercial operation.

Another procedure for oxygen difluoride preparation in accordance with above Reaction 1 comprises continuously generating excess quantities of gaseous fluorine through a dilute caustic solution. A very short contact time between the caustic and fluorine is also required in this procedure according to prior art disclosures in order to avoid the above set forth secondary reaction. The oxygen difluoride yield of the gaseous product obtained by this procedure is disclosed to be in the range of about 50 percent. In addition to the low yields obtainable by this procedure numerous operational problems are encountered when fluorine is reacted with dilute caustic under the conditions of the procedure. For example, as in the batch process, rapid increase in temperature resulting from the highly exothermic reaction not only is responsible for excessive decomposition of oxygen difluoride usually resulting in yields of about 50 percent but also causes explosions in the vapor phase of the reactor and in the recovery vessels due to the presence of excess quantities of unreacted fluorine. Furthermore, burning and high corrosion rates at the fluorine nozzle outlet as well as at the liquid level within the reactor due to elevated caustic solution temperatures generated during the reaction and high oxygen concentrations resulting from excessive decomposition of oxygen difluoride are frequently experienced thereby necessitating expensive repairs to the equipment and disrupting continuous operation.

Therefore, there is a great need for development of a method capable of producing oxygen difluoride in commercial quantities without the concomitant disadvantageous characteristics of the prior art procedures.

With the foregoing in mind, the principal object of the present invention may be said to reside in the provision of a novel process for producing oxygen difluoride by an economical and commercially feasible method.

Another object of this invention resides in the provision of a process for the production of oxygen difluoride free of explosion hazards.

A further object of this invention is to provide a continuous process for the production of oxygen difluoride free of operational difficulties disruptive of continuous operation.

Further objects and advantages will be apparent from the following description and drawing.

The drawing provides a simplified flow diagram illustrative of the novel process to be described hereinafter.

According to the invention, oxygen difluoride is prepared in high yields by reaction of fluorine gas with an aqueous solution of a base by introducing the aqueous base into a reaction zone at a temperature not greater than about 70° F., preferably not greater than about 45° F. and dispersing fluorine gas into the aqueous base at a controlled rate sufficient to permit the aqueous base and fluorine gas to be in contact for a period of about 0.5 to 5.0 seconds, preferably 1 to 2 seconds, and to provide a liquid to gas volume ratio in excess of 20 liters, preferably in excess of 50 liters, of aqueous base per liter of fluorine gas. The contacting of fluorine gas with the basic solution of the present invention is in sharp contrast to oxygen difluoride preparation procedures disclosed in the prior art wherein short contact times, generally about 0.1 second, are employed. Furthermore, contrary to prior art procedures which require short contact times to preclude excessive decomposition of oxygen difluoride, the process of the present invention is based on the discovery that the specified liquid to gas ratios rather than short contact times of oxygen difluoride with basic solution are responsible for controlling excessive decomposition of oxygen difluoride product produced in accordance with Reaction 1 above.

While we do not wish to be bound by any specific theory, it is believed that as oxygen difluoride is formed in solution at an extremely high rate its heat of reaction causes rapid formation of small hot bubbles. Essentially, microscopic explosions occur in the reaction zone. The oxygen difluoride formed undergoes rapid thermal decomposition and reaction with the basic solution in accordance with Reaction 2, above set forth. This decomposition reaction is greatly accelerated by the existence of microscopic "hot spots" within the hot oxygen difluoride gas bubbles. By having present in the reaction zone a high basic solution to fluorine gas volume ratio, at least of the order specified, the rate of heat removal from the bubbles is increased and the effect of the microscopic "hot spots" which contribute to the excessive thermal decomposition of oxygen difluoride is minimized. The decomposition reactions are therefore decreased and significant yield increases are obtained.

In accordance with the process of the present invention, oxygen difluoride yields in excess of 70 percent of the theoretical are realized. Moreover, when the temperature of the basic solution employed is not greater than about 45° F. the lower temperatures around the oxygen difluoride bubbles slow the formative and decomposition Reactions 1 and 2 set forth above, thereby reducing the rate of heat formation and allowing for obtainment of oxygen difluoride in yields in excess of 85 percent of the theoretical. In addition, by conducting the reaction under conditions of very high liquid to gas volume ratios it has been found that unreacted fluorine is not obtained in the vapor phase of the reactor. Since rapid temperature increases are precluded in the reaction zone by the provision of a large heat sink in the form of the basic solution, and unreacted fluorine is not a product of the vapor phase of the reactor, potentially explosive gaseous mixtures normally found in the procedures described in the prior art are avoided. Moreover, since the crude oxygen difluoride gaseous product obtained in the present process is purer than crude gaseous products obtained by the prior art procedures, less expensive recovery systems, accompanied by less oxygen difluoride purification losses, may be employed. Furthermore, burning at the fluorine nozzle is effectively suppressed by the procedure of the present invention, thereby allowing for continuity of operation and decreased equipment replacement.

In practicing the invention, a dilute aqueous basic solution such as an alkali metal hydroxide, illustratively sodium or potassium hydroxide, having a concentration of about 0.1 to 5.0 weight percent, preferably 1.0 to 3.0 weight percent, based on the weight of solution, is continuously introduced into a reaction zone. The water employed in formulating the dilute base may be obtained from local water supplies but preferably is demineralized by passage through any conventional mixed bed anion-cation ion exchange unit for reduction of the carbonate content contained therein. Prior to introduction into the reaction zone the dilute base is preferably filtered for removal of impurities and then cooled to a temperature below about 70° F., preferably below about 45° F., by use of any conventional refrigeration system. The minimum temperature at which the base may be introduced is limited only by the efficiency of the refrigeration system employed and temperatures approximating the freezing point of dilute aqueous base at the specified concentrations are not only suitable but provide a most effective method for increasing oxygen difluoride yields and minimizing operational difficulties of the nature above specified. The pressures employed in the reaction zone during the reaction are not critical and may range from about 0 to 10 p.s.i.g. Slightly positive pressures in the range of about 0 to 2 p.s.i.g. are generally preferred.

The rate of introduction and withdrawal of the basic solution into and from the reaction zone may be widely varied. In normal operation the concentration of this reactant is maintained within the above specified range during the course of reaction with the fluorine gas. Since the basic solution is employed not only as a reactant for reaction with the fluorine gas but also serves as a heat sink for absorption of heat resulting from the highly exothermic reaction, sufficient quantities of basic solution are maintained in the reactor and the reactor liquid contents are continuously replenished with freshly precooled basic solution to carry out these intended purposes. In practicing the invention, the rate of introduction and withdrawal of the basic solution is generally controlled to preclude an excessive increase in temperature in the liquid phase of the reaction zone. Normally, it is desirable to maintain the temperature of the liquid phase in the reactor within about 25° F., preferably 10° F., of the temperature of the precooled basic solution continuously fed into the reactor.

The gaseous fluorine reactant may be introduced into the reaction zone at the opposite end from that at which the dilute base is charged thus providing for countercurrent flow, or alternatively, may be introduced in the same direction of flow at which the basic solution is charged. In order to insure adequate dissipation of the heat evolved from the highly exothermic reaction and thereby preclude excessive thermal decomposition of the oxygen difluoride product, it has been found that the fluorine gas must be contacted with the aqueous base solution below the liquid level thereof at a controlled rate to provide in the reaction zone a liquid to gas volume ratio in excess of 20 liters, preferably in excess of 50 liters, of basic solution per liter of fluorine gas. Advantageously, the fluorine gas is intimately dispersed in the aqeous basic solution so that the very high liquid to gas volume ratio is continuously maintained, insuring substantially complete conversion of fluorine to the desired oxygen difluoride product. Intimate dispersion of the fluorine gas below the liquid level of the aqueous base solution may be readily effected by use of any conventional apparatus capable of dispersing the gaseous fluorine reactant in finely divided bubble form. In general, the fluorine gas bubbles are in contact with the aqueous base below the liquid level thereof for a time sufficient to effect complete reaction of the fluorine gas introduced into the reaction zone to desired oxygen difluoride product. Contact of the fluorine bubbles with the aqueous base solution at these proportions of liquid to gas volumes normally may range from about 0.5 to 5.0 seconds, although contact times of 1.0 to 2.0 seconds are preferred. Such procedure is completely contrary to prior art procedures wherein large quantities of unreacted fluorine gas are evolved into the vapor phase of the reaction zone and short contact times are considered to be essential to avoid excessive decomposition of oxygen difluoride when in prolonged contact with the aqueous base.

The rate at which the fluorine gas is introduced into the reaction zone is dependent upon the liquid to gas volume ratios present in the reaction zone. Generally, fluorine in dispersed bubble form is introduced at a rate such that liquid to gas volume ratios are maintained within the above specified range and the molar ratios of base to fluorine present in the reaction zone are in excess of 5 mols of base (100% base basis) per mol of fluorine, and, preferably are in excess of about 20 mols of base per mol of fluorine charged.

Oxygen difluoride product, continuously formed as fluorine is bubbled through the basic solution, is withdrawn from the vapor phase of the reactor and recovered by conventional procedures. In recovering oxygen difluoride, the crude gases exiting from the reactor are flown in series through a first trap operated at ambient temperatures and 0 p.s.i.g to 10 p.s.i.g to remove water mist and then through a second trap cooled by Dry Ice at about −110° F. and 0 p.s.i.g. to 10 p.s.i.g. wherein water vapor is condensed from the crude product. The gaseous mixture resulting from the second trap, comprised primarily of oxygen difluoride product, oxygen and minor amounts of carbon dioxide, is then condensed in a series of cold traps cooled by liquid nitrogen at temperatures of about −320° F. and pressures of 1 to 25 p.s.i.a. After each of the traps becomes filled with the condensed product, oxygen is removed therefrom by slowly warming the trap, thereby allowing oxygen by-product to vaporize. Desired oxygen difluoride product in yields in excess of 70% of theoretical and having a purity of at least 97% is normally recovered by this procedure.

Applicants' invention will now be described in more detail with relation to the drawing previously mentioned.

The process may be carried out by employing apparatus comprising an atmospheric blending tank 10 having inlet conduits 11 and 12 for introducing concentrated base and water in the desired proportions. The dilute base flows through valved conduit 14 to pump 15 which forces the dilute caustic through filter 17, precooler 21 and into reactor 22 via valved conduits 16, 18 and 20. The flow rate of the dilute base to reactor 22 is measured by flow meter 19 and control valve 23 is provided to control the instantaneous caustic flow rate. Temperature indicator 35 measures the temperature of the dilute base supplied to bubble reactor 22.

Fluorine from any suitable source, preferably free of hydrogen fluoride, flows through valved conduits 24 and 26 to reactor 22. Flow meter 25 of any suitable type, such as a rotameter, is provided to measure the instantaneous fluorine flow rate and valve 27 is provided to control the instantaneous fluorine flow rate. If desired, flow meter 25 may be one the standard flow controllers available and it may be connected to a suitable type of control valve 27 in order to maintain automatically the instantaneous fluorine flow rate at any predetermined value.

Fluorine is introduced into the dilute base through pipe (or pipes) 28 provided with at least one orifice. Spent caustic is continuously withdrawn from reactor 22 through conduit 33 and any absorbed gases are vented therefrom to the atmosphere via conduit 34. Thermometer 29 measures the reaction temperature. This thermometer can be replaced by any standard temperature indicator controller which will partially or completely close valve 27 when a predetermined maximum temperature is reached in reactor 22 and/or actuate valve 23 for the introduction of cooled caustic and valve 30 for the withdrawal of spent caustic. Thermometer 31 measures the temperature of the gases evolved in reactor 22 and thermometer 32 measures the temperature of the spent caustic exiting through conduit 33.

The gases evolved from the reaction are removed from reactor 22 through conduit 37 and passed to cold trap (or a series of cold traps) 38 for separation of entrained water mist and water vapor. Pressure gauge 40 is provided for determining the static pressure in the reactor, and pressure controller 36 is provided for the purpose of regulating this pressure. Gas analyzer 41 is provided in the system for purposes of analyzing the gaseous products resulting from reactor 22. The oxygen difluoride product is then recovered from the gaseous mixture evolved from reactor 22 by conventional procedures, for example, as above described.

It will be apparent to anyone skilled in the art that other types of apparatus can be used equally successfully. The use of specific apparatus or combinations of specific apparatus is not critical to the process of this invention, but rather the procedural steps and process conditions are critical. Hence, any apparatus which will provide the procedural steps and process conditions may be suitable for operating the process of this invention.

It is also apparent that the process of this invention can be operated either as a batch, intermittent batch or as a continuous process by means of recognizable variations in the apparatus and the use thereof.

The process of this invention is illustrated by the following specific examples.

*Example 1*

Into vertical corrosion resistant reactor 22 (1" x 1½" x 30"), purged of air with nitrogen, there was continuously introduced an aqueous potassium hydroxide solution having a concentration of 1.91% by weight based on the weight of solution and a carbonate content of 0.039% by weight (calculated as percent potassium carbonate). The potassium hydroxide solution, previously cooled to a temperature of 42° F., was fed into the reactor, maintained at a pressure of about 2 p.s.i.g., at a rate of 640 grams per minute. Fluorine was continuously bubbled into the aqueous potassium hydroxide solution through a 0.055 inch (ID) pipe positioned 10 inches below the liquid level at a rate of 700 cubic centimeters per minute. Spent potassium hydroxide solution at a temperature of 50° F. having a weight concentration of 1.46% was continuously withdrawn at a rate sufficient to maintain the liquid level in the reactor. After operation for a period of about 5 minutes, the temperature of the potassium hydroxide solution in the reactor increased to and was maintained at about 48° F. and the temperature of the resulting gases obtained from the reaction was about 78° F. Under these conditions, bubbles of fluorine gas were in contact with the cooled potassium hydroxide solution for a period of about 0.5 to 2 seconds and the liquid to gas ratio in the liquid phase of the reaction zone was about 20 to 25 liters of potassium hydroxide solution per liter of fluorine gas.

The gases evolved from the vapor phase of the reactor were continuously discharged via conduit 37 and passed through cold trap 38 operated at −110° F. and 15 p.s.i.g. to remove water mist and water vapor. Analysis of the resulting cooled gases by gas chromatography showed that a yield of 85.6% of theoretical of oxygen difluoride was obtained.

*Example 2*

The procedure of Example 1 was repeated using a potassium hydroxide solution having a concentration of 2.02% and a carbonate content of 0.024% (calculated as percent potassium carbonate). The potassium hydroxide solution was previously cooled to a temperature of 72° F. and was introduced into the reactor, maintained at a pressure of about 2 p.s.i.g., at a rate of 640 grams per minute. Fluorine was continuously bubbled into the aqueous potassium hydroxide solution through a 0.055 inch (ID) pipe positioned 20 inches below the liquid level at a rate of 700 cubic centimeters per minute. The spent potassium hydroxide solution having a concentration of 1.53% exited at a temperature of 79° F. After a period of about 5 minutes the temperature in the reactor increased to and was maintained at about 80° F. and the temperature of the gases evolved from the reaction in the vapor phase of the reactor was about 75° F. At these conditions, the liquid to gas volume ratio in the liquid phase of the reaction zone was about 25 to 30 liters of potassium hydroxide solution per liter of fluorine gas and the contact time between the liquid and fluorine gas in the reactor was about 1 to 4 seconds.

The effluent gases from the reactor were passed through a cold trap as described in Example 1 for removal of water mist and water vapor. Analysis of the resulting cooled gases by gas chromatography showed that a yield of 74.53% of theoretical of oxygen difluoride was obtained.

*Example 3*

The procedure of Example 1 was repeated using a potassium hydroxide solution having a concentration of 2.11% by weight based on the weight of solution and a carbonate content of about 0.03% (calculated as potassium carbonate). The potassium hydroxide solution was previously cooled to a temperature of 40° F. and was fed into the reactor, maintained at a pressure of about 2 p.s.i.g., at a rate of 640 grams per minute. Fluorine was continuously bubbled into the aqueous potassium hydroxide solution through a 0.1175 inch (ID) pipe positioned 10 inches below the liquid level at a rate of 700 cubic centimeters per minute. Spent potassium hydroxide solution having a concentration of 1.69% by weight exited from the reactor at a temperature of 57° F. After a period of about 5 minutes, the temperature in the reactor increased to and was maintained at about 48° F. and the temperature of the gases evolved in the vapor phase of the reactor was approximately 83° F. At these conditions, the liquid to gas volume ratio in the liquid phase of the reaction zone was about 20 to 25 liters of potassium hydroxide solution per liter of fluorine gas and the contact time between the liquid and fluorine gas bubbles was about 0.5 to 2 seconds.

The effluent gases from the reactor were passed through a cold trap as described in Example 1 for removal of water mist and vapor. Analysis of the resulting cooled gases by gas chromatography showed that a yield of 86.79% of theoretical of oxygen difluoride was obtained.

*Example 4*

Into a vertical corrosion resistant reactor 22, described in Example 1, purged of air with nitrogen, there was continuously introduced an aqueous potassium hydroxide solution having a concentration of 2.0% based on the weight of solution. The potassium hydroxide solution previously cooled to a temperature of 70° F. was fed into the reactor, maintained at a pressure of 2 p.s.i.g., at a rate of 640 grams per minute. Oxygen difluoride gas, analyzing 99.19% oxygen difluoride, 0.75% oxygen and 0.05% carbon dioxide by volume, was continuously bubbled into the aqueous potassium hydroxide solution through a 0.1175 inch (ID) pipe positioned 20 inches below the liquid level at a rate of 700 cubic centimeters per minute. Spent potassium hydroxide solution having a concentration of 1.97% exited from the reactor at a temperature of 70° F. After a period of about 5 minutes, the temperature in the reactor was observed to be 71° F. and the temperature of the gases in the vapor phase of the reactor was 70° F. Under these conditions, oxygen difluoride bubbles were in contact with the potassium hydroxide solution for a period of about 1 to 4 seconds. Analysis of the gases resulting from the vapor phase of the reactor by gas chromatography showed that the gaseous product consisted of 95.68% oxygen difluoride and 4.32% oxygen by volume.

This experiment illustrates that under the conditions of the present invention, substantial decomposition of oxygen difluoride product is avoided.

Although certain preferred embodiments of the invention have been disclosed for purpose of illustration, it will be evident that various changes may be made therein without departing from the scope and spirit of the invention.

We claim:

1. A continuous process for preparing oxygen difluoride which comprises continuously introducing into a reaction zone at a temperature greater than the freezing temperature of the aqueous base and not greater than about 45° F. a liquid aqueous solution consisting of potassium hydroxide, the concentration of which is in the range of about 1 to 3% by weight based on the weight of the solution, continuously dispersing fluorine gas below the liquid level of said potassium hydroxide solution at a controlled rate sufficient to permit the aqueous base and fluorine gas to be in contact for a period of about 0.5 to 5 seconds and to provide a liquid to gas volume ratio in excess of 50 liters of potassium hydroxide solution per liter of fluorine gas, continuously withdrawing spent potassium hydroxide solution from the liquid phase of the reaction zone at a rate sufficient to maintain the temperature of the liquid phase of the reaction within about 10° F. of the potassium hydroxide solution introduced into the reaction zone and to maintain said liquid to gas volume ratio and said potassium hydroxide concentration, continuously withdrawing gaseous effluent from the vapor phase of the reaction zone, and continuously recovering oxygen difluoride product from the gaseous effluent.

References Cited

Schnizlein et al., "J. of Physical Chemistry," vol. 56, pp. 233 and 234, February 1952.

Streng, Chem. Rev., vol. 63 (6), pp. 608 and 610, December 1963.

OSCAR R. VERTIZ, *Primary Examiner.*

G. T. OZAKI, *Assistant Examiner.*